(12) United States Patent
Diehl et al.

(10) Patent No.: US 11,787,161 B2
(45) Date of Patent: Oct. 17, 2023

(54) TRIM ELEMENT

(71) Applicant: JOYSONQUIN Automotive Systems GmbH, Rutesheim (DE)

(72) Inventors: Ann-Kathrin Diehl, Stuttgart (DE); Frank Huhnerbein, Sachsenheim (DE)

(73) Assignee: Joysonquin Automotive Systems GmbH, Rutesheim (DE)

( * ) Notice: Subject to any disclaimer, the term of this patent is extended or adjusted under 35 U.S.C. 154(b) by 114 days.

(21) Appl. No.: 17/145,836

(22) Filed: Jan. 11, 2021

(65) Prior Publication Data

US 2021/0213890 A1  Jul. 15, 2021

(30) Foreign Application Priority Data

Jan. 13, 2020 (DE) .......................... 102020200312.2

(51) Int. Cl.
  *B32B 27/08* (2006.01)
  *B32B 3/26* (2006.01)

(52) U.S. Cl.
  CPC .............. *B32B 27/08* (2013.01); *B32B 3/266* (2013.01); *B32B 2307/412* (2013.01)

(58) Field of Classification Search
  CPC .... B32B 27/08; B32B 3/266; B32B 2307/412
  USPC ....................................................... 428/195.1
  See application file for complete search history.

(56) References Cited

U.S. PATENT DOCUMENTS

| | | | |
|---|---|---|---|
| 2001/0040393 A1 | 11/2001 | Sano et al. | 296/209 |
| 2005/0202574 A1 | 9/2005 | Wilfert et al. | 438/3 |
| 2021/0213890 A1* | 7/2021 | Diehl | B32B 5/024 |

FOREIGN PATENT DOCUMENTS

| | | |
|---|---|---|
| DE | 43 01 444 A1 | 7/1994 |
| DE | 102009024307 | 12/2010 |
| DE | 102015101012 | 7/2016 |
| DE | 102016217949 | 3/2018 |
| EP | 1577165 | 9/2005 |

OTHER PUBLICATIONS

CN-111315572-A in English. (Year: 2020).*
German Office Action or Search Report dated Nov. 9, 2020 in corresponding German application No. 10 2020 200 312.2; 8 pages.

* cited by examiner

*Primary Examiner* — Betelhem Shewareged
(74) *Attorney, Agent, or Firm* — Fattibene and Fattibene, LLC; Paul A. Fattibene

(57) ABSTRACT

A trim element, in particular for a vehicle interior, which conveys a particular aesthetic impression. A trim element with a first decorative layer that is light-transmissive at least in part between a light-transmissive intermediate layer on a rear side of the first decorative layer and a transparent cover layer and a second decorative layer of the intermediate layer on a front side of the second decorative layer and a carrier, where the second decorative layer is visible at least in part through the intermediate layer.

15 Claims, 1 Drawing Sheet

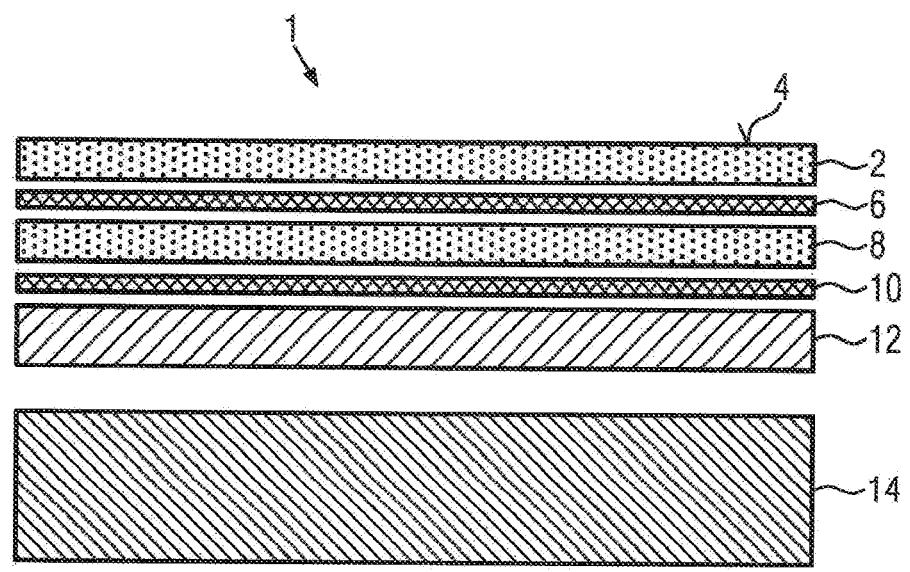

TRIM ELEMENT

FIELD OF THE INVENTION

The present application relates to a trim element, in particular for a vehicle interior.

BACKGROUND OF THE INVENTION

Such trim elements are used, for example, as interior lining elements on doors, the headliner, the center console, or the dashboard. They are also used to design ashtrays or even control buttons in the interior of a vehicle.

A method for producing a lining element is known from DE 43 01 444 A1 in which a decorative layer is back-injection molded on the rear side to form a carrier and is on the visible side injection-overmolded with a transparent plastic material to form a cover layer.

EP 1 577 165 B1 discloses a trim element which has a decorative layer, formed from a planar metal structure which is provided in part with through holes and is therefore transparent in part, which is covered on the visible side with a transparent cover layer and supported on the rear side by a carrier. The surface of the carrier can be seen through the decorative layer.

The previously known designs for trim elements, in particular for lining a vehicle interior, still leave room for improvement.

The present invention aims to create a trim element which conveys a particular aesthetic impression.

SUMMARY OF THE INVENTION

For this purpose, a trim element is proposed having the features of a light-transmissive intermediate layer between decorative layers. The trim element has a transparent cover layer on the visible side which covers a first decorative layer which is backed with an intermediate layer. The first decorative layer is light-transmissive in part. In other words, the first decorative layer is formed such that is appears decorative for itself without being entirely opaque or entirely transparent. The first decorative layer can in particular be woven fabric, knitted fabric, a metal layer that is transparent at least in part, such as, for example, expanded metal or punched sheet metal, in particular perforated sheet metal provided with a uniform grid. The first decorative layer can also be formed from veneer or the like and can be made to be light-transmissive at least in part by punching an initially uniform veneer layer. The first decorative layer can be formed by any of the aforementioned materials (woven fabric, knitted fabric, a partially transparent metal layer, a partially light-transmissive veneer) or any combination thereof. Preferably, the first decorative layer consists of one of the aforementioned materials, or any combination thereof. In another preferred aspect of the invention, the first decorative layer can comprise a fully transparent region, while it at least partially consists of one of the aforementioned materials or any combination thereof.

The first decorative layer can be made of a single material. But it can also be produced as a composite of several substances. The first decorative layer can there have decorative elements embedded in a transparent matrix. These decorative elements can be numbers, letters or geometric elements. They can be introduced into the first decorative layer discretely or in the form of a continuum.

The trim element according to the invention further has a second decorative layer. It is located between the aforementioned intermediate layer, which is provided on the front side of the second decorative layer, and a carrier. The second decorative layer is visible at least in part through the intermediate layer.

With the trim element according to the invention, the viewer, when looking onto the trim element, can accordingly see the first decorative layer through the transparent cover layer and, since the latter is light-transmissive at least in part, for example provided with through holes, see the second decorative layer through the transparent intermediate layer, which can convey the impression of geometric depth. The first and the second decorative layers are spaced apart from one another by the intermediate layer. For example, a first decorative layer provided with through holes can convey a different visual appearance of the trim element in dependence of the viewing angle. The layers can also have varying thicknesses, so that lens effects and optical faults and distortions can be used to convey a special aesthetic impression.

However, in view of making the trim element as thin as possible, the layers of the trim element are typically provided with a uniform thickness at least on a main surface of the trim element which is intended to cover the underlying structure, in particular of a vehicle. Accordingly, each layer by itself preferably has a uniform layer thickness.

The second layer is preferably light-transmissive at least in part. This provides the possibility of backlighting the trim element from the rear side, i.e. via the carrier or an underlying substructure which can be designed as a light guide, light coupling layer, or illumination device. Where the second decorative layer can also be with through holes and only light-transmissive in part and opaque in part. In conjunction with backlighting the second decorative layer, this can result in an interesting play of shadows with which the first decorative layer is transilluminated and which can be experienced on the transparent cover layer.

Plastic materials are typically employed for the design of the cover layer and/or the intermediate layer. The cover layer is preferably made of PUR or PMMA or TPU, respectively. The intermediate layer can be formed in the same way from such plastic materials. With regard to good adhesion of the intermediate layer to the cover layer in the case of a decorative layer that is fluid-permeable in part, it is preferable to form the cover layer and the intermediate layer from the same plastic materials. The plastic materials mentioned above can be crystal clear and therefore transparent. They can also be colored transparently so that the plastic only allows for a certain light refraction.

Starting out from a surface of the upper part formed on the visible side of the trim element, the trim element, according to a preferred development of the present invention, has the transparent cover layer, the first decorative layer, the intermediate layer, and the second decorative layer as well as the carrier and possibly the aforementioned light coupling layer. Where the aforementioned layers directly follow one another. The carrier typically has a surface extending parallel to the underside of the second decorative layer. The rear side of the carrier, however, can be provided with functional elements for fastening the trim element to the vehicle. The carrier can be in particular injection-molded from plastic material and provided with anchoring webs or the like. These fastening elements for fastening the trim element to a substructure are typically injection molded integrally onto a carrier made of plastic material. In the case of a substructure, for example a light coupling layer on the front side or rear side of the carrier, the carrier can likewise be a planar layer with an extension extending parallel to the other layers of the trim element.

In particular in connection with a first decorative layer which is provided with through holes and is accordingly transparent in part and non-transparent in part, the second decorative layer should have a surface that is reflective in the direction toward the transparent cover layer. Such a surface can be formed, for example, from a mirror film which preferably forms the second decorative layer.

The second decorative layer can also be an IMD layer. IMD means in-mold decoration and identifies a part coated with a motif, where the motif is introduced from a carrier film into an open mold tool and transferred onto the plastic surface when the plastic material is molded. In this manner, the second decorative layer can be provided with a motif. However, the motif can also be applied directly onto the carrier so that the second decorative layer consists solely of the motif. The motif is preferably located on a reflective surface of the second decorative layer, as a result of which the visual appearance of the trim element on the visible side can be further refined.

The present invention also relates to a method for producing a trim element of the aforementioned kind. In a first methodical procedure, the second decorative layer is first back-injection molded with carrier plastic material on the rear side. This forms the carrier. The double-layer component thus obtained in this manner is placed into an injection mold. A gap, into which intermediate layer plastic material is injected, is formed between the surface of the second decorative layer and the rear side of a first decorative layer previously placed into the second decorative layer. When this intermediate layer plastic material sets, the two decorative layers are bonded to one another and an intermediate product is formed which comprises the carrier, the second decorative layer, the intermediate layer, and the first decorative layer. This intermediate product is thereafter injection-injection-overmolded with cover layer plastic material, which forms the transparent cover layer.

This procedure allows for the trim element to be produced solely by injection-molding. They are typically manufactured using a multi-component tool. The gap between the two decorative layers can be created by suctioning at least the first decorative layer. The second decorative layer typically remains with the carrier in a tool half that was also used in producing the carrier on the rear side of the second decorative layer. The intermediate product thus produced remains in the tool half and is used, for example, as a turning tool.

The injection-molding tool suitable for production has, for example, three different stations, namely a first station in which the second decorative layer is provided with the carrier by injection-molding the carrier plastic material, a second station into which the aforementioned intermediate product is taken by relative motion of one tool half and joined with a further tool half which receives the first decorative layer in itself, where the gap remains between the first and the second decorative layer after the tool has closed. In the third station, the cover layer plastic material is injection-overmolded. For this purpose, the intermediate product produced in the second station is typically again transferred with the tool half that has already been moved to the second station. The finished trim element is thereafter demolded. The multiple component injection-molding tool can have a turntable that passes through the three stations mentioned above and possibly a fourth station in which the finished product is exposed and which can be used to demold the finished trim element from one of the tool halves while an injection-molding cycle is running at stations 1 to 3.

In an alternative methodical procedure, the first and the second decorative layer are bonded to one another by way of the intermediate layer. Thereafter, the second decorative layer is back-injection molded with the carrier plastic material in order to form the carrier and the first decorative layer is injection-overmolded with the cover layer plastic material in order to form the transparent cover layer. Molding the carrier and molding of the cover layer typically take place consecutively, not simultaneously. If the carrier forms fastening elements for mounting the trim element, it typically requires a longer cooling time, so that generally the transparent cover layer is first injection-molded and thereafter the carrier which can continue to cool even after the finished trim element has been demolded.

In the alternative procedure, the first and the second cover layers do not necessarily have to be bonded to one another by way of injection-molding, as was discussed for the first variant. The two layers can instead also be bonded to one another by calendering or extrusion with the interposition of the intermediate layer. In this way, a substantially planar intermediate product can first be produced which comprises the intermediate layer, the first decorative layer, and the second decorative layer. This intermediate product is then preferably deformed three-dimensionally in order to give the intermediate product the three-dimensional contour necessary for the trim element. Because the trim element typically follows the contour prescribed by the vehicle on the dashboard or the door lining. The deformed intermediate product is then typically back-injection molded with the carrier plastic material and injection-overmolded with the cover layer plastic material. The finished product is then obtained.

BRIEF DESCRIPTION OF THE DRAWING

The FIGURE in the drawing schematically illustrates layers of the trim element of the present invention.

DETAILED DESCRIPTION OF THE DRAWING AND INVENTION

The present invention shall be explained in more detail below on the basis of an embodiment in conjunction with the drawing, which illustrates schematically different layers of the trim element that are illustrated spaced from each other in the drawing for reasons of illustration. The trim element is identified as a whole by reference numeral 1. The transparent cover layer 2, which forms a surface 4 of the trim element 1, is located on the visible side. A first decorative layer 6 that is translucent in part is located on the rear side of the transparent cover layer 2 disposed opposite to the surface 4. It can be formed, for example, by a metal mesh or a veneer provided with a hole pattern. Disposed on the rear side of the first decorative layer 6 located opposite to the transparent cover layer 2 is a light-transmissive intermediate layer 8 which in the present case is made of PMMA.

Disposed on its rear side in turn in the embodiment is a second decorative layer 10 which is formed by a mirror film. This second decorative layer is backed by a plastic carrier 12 which is supported by a substructure 14. The substructure 14 can be alight guide or a base carrier with an illumination device integrated therein or a light coupling layer or a light guide layer.

The first decorative layer 6 preferably also has a visually appealing design on its rear side. In the embodiment outlined, it is possible for a viewer of the trim element 1 to look through the one or more through holes in the first decorative layer 6 onto the second decorative layer 10 which directs the view to the rear side of the first decorative layer 6. With regard to this special visual effect, the rear side of the first decorative layer can be colored or designed differently than the front side of the first decorative layer 6. The first decorative layer 6 can also be a composite layer which is formed, for example, on the front side by a metal film and on the rear side by a veneer, whereby the visual appearance of the trim element is further improved.

The second decorative layer can be light-transmissive in part, so that light rays emitted from the substructure 14 pass through the plastic carrier 12 that is translucent at least in part through the second decorative layer, penetrate the intermediate layer 8 and the first decorative layer 6 as well as the transparent cover layer 2 and accordingly backlight the trim element 1. The second decorative layer 10 or the plastic carrier 12 there do not need to be transparent. Both layers or one of the layers can let the light beam pass through, at the same time refract the light beam, which leads to a uniform distribution of the light in the second decorative layer 10 and/or the plastic carrier 12.

LIST OF REFERENCE NUMERALS

1 trim element
2 transparent cover layer
4 surface
6 first decorative layer
8 light-transmissive intermediate layer
10 second decorative layer
12 plastic carrier
14 substructure

What is claimed is:

1. Trim element, in particular for a vehicle interior, comprising:
    a first decorative layer that is light-transmissive at least in part between a light-transmissive intermediate layer on a rear side of said first decorative layer and a transparent cover layer, wherein said transparent cover layer and said intermediate layer are formed from a plastic material, and
    a second decorative layer between said intermediate layer on a front side of said second decorative layer and a carrier,
    wherein said second decorative layer is visible at least in part through said intermediate layer, and said second decorative layer has a decorative layer surface that is reflective in the direction towards said transparent cover layer and the decorative layer surface is formed from a mirror film which forms said second decorative layer, and
    wherein, starting out from a surface of said trim element formed on a visible side of said trim element, said transparent cover layer, said first decorative layer, said intermediate layer, said second decorative layer, and said carrier are provided immediately subsequent to one another.

2. Trim element according to claim 1, wherein said second decorative layer is light-transmissive at least in part.

3. Trim element according to claim 2, wherein said carrier is light-transmissive at least in part and that a light guide layer is provided on the rear side of said carrier.

4. Trim element according to claim 1, wherein said plastic material is PUR, PMMA or TPU.

5. Trim element according to claim 1, wherein said first decorative layer is a layer provided with through holes.

6. Trim element according to claim 1, wherein said second decorative layer is an IMD layer or in-mold decoration layer.

7. Trim element according to claim 1, wherein at least one of the first decorative layer and the second decorative layer is formed from a different material than the light-transmissive intermediate layer and the transparent cover layer.

8. Trim element according to claim 1, wherein at least one of the first decorative layer and the second decorative layer comprises at least one opaque layer region with a decorative appearance.

9. Trim element according to claim 1, wherein the first decorative layer comprises a woven fabric, a knitted fabric, a metal layer or a veneer, the veneer being formed and made light-transmissive at least in part by punching an initially uniform veneer layer.

10. Method for producing a trim element according to claim 1, in which
    said second decorative layer is first back-injection molded with carrier plastic material on the rear side,
    intermediate layer plastic material is subsequently injected into a gap between said first and said second decorative layer, and
    said first decorative layer is finally injection-overmolded with cover layer plastic material.

11. Method for producing a trim element according to claim 1, in which
    said first and said second decorative layer are first bonded to one another by way of said intermediate layer and
    said second decorative layer is back-injection molded with carrier plastic material and said first decorative layer is injection-overmolded with cover layer plastic material.

12. Method according to claim 11, wherein said first and said second decorative layer are bonded to one another by injecting intermediate layer plastic material into a gap between said first and said second decorative layer.

13. Method according to claim 12, in which a planar intermediate product comprising said intermediate layer, said first decorative layer, and said second decorative layer is first produced and thereafter formed into a reshaped intermediate product which is then back-injection molded with carrier plastic material and injection-overmolded with said cover layer plastic material.

14. A trim element for a vehicle interior comprising:
    a plastic transparent cover layer forming a surface;
    a fluid-permeable light-transmissive first decorative layer with first decorative elements placed on said transparent cover;
    a plastic light-transmissive intermediate layer placed on said first decorative layer;
    a second decorative layer comprising a mirror film with second decorative elements placed on said plastic light-transmissive intermediate layer;
    a carrier placed on said second decorative layer; and
    a substructure placed on said carrier,
    whereby said first plastic transparent cover layer and said plastic light-transmissive intermediate layer are capable of adhering together through said fluid-permeable light-transmissive first decorative layer and the second decorative elements are visible through said plastic light-transmissive intermediate layer.

15. A trim element according to claim 14 wherein:
    said plastic transparent cover layer and said plastic light-transmissive intermediate layer are made from the same plastic materials.

* * * * *